(12) United States Patent
Hill

(10) Patent No.: US 10,220,695 B2
(45) Date of Patent: Mar. 5, 2019

(54) MOUNTING STRUCTURE FOR AN ENGINE MOUNT AND METHOD

(71) Applicant: BENTLEY MOTORS LIMITED, Cheshire (GB)

(72) Inventor: Keith Hill, Cheshire (GB)

(73) Assignee: BENTLEY MOTORS LIMITED, Crewe, Cheshire (GB)

(*) Notice: Subject to any disclaimer, the term of this patent is extended or adjusted under 35 U.S.C. 154(b) by 132 days.

(21) Appl. No.: 15/128,940

(22) PCT Filed: Mar. 20, 2015

(86) PCT No.: PCT/GB2015/050824
§ 371 (c)(1),
(2) Date: Sep. 23, 2016

(87) PCT Pub. No.: WO2015/155500
PCT Pub. Date: Oct. 15, 2015

(65) Prior Publication Data
US 2017/0100997 A1    Apr. 13, 2017

(30) Foreign Application Priority Data

Apr. 8, 2014    (GB) .................................. 1406336.6

(51) Int. Cl.
*B60K 5/10* (2006.01)
*B60K 5/12* (2006.01)
*B62D 65/00* (2006.01)

(52) U.S. Cl.
CPC .................. *B60K 5/10* (2013.01); *B60K 5/12* (2013.01); *B60K 5/1208* (2013.01); *B60K 5/1283* (2013.01); *B62D 65/00* (2013.01)

(58) Field of Classification Search
CPC ...... B60K 5/1216; B60K 5/12; B60K 5/1241; B60K 5/1283; F16F 1/3849; B62D 27/065
See application file for complete search history.

(56) References Cited

U.S. PATENT DOCUMENTS 3,694,895 A * 10/1972 Werner ................ B60K 5/1283
29/469
3,762,671 A * 10/1973 Schulz ................ B60K 5/1283
267/140.2

(Continued)

FOREIGN PATENT DOCUMENTS

DE         19718049 C1    11/1998
EP          1055539 A2    11/2000
(Continued)

*Primary Examiner* — Bradley Duckworth
(74) *Attorney, Agent, or Firm* — Schwabe Williamson & Wyatt, P.C.

(57) ABSTRACT

A mounting structure for an engine mount (9) for an internal combustion engine. A fitting (19), such as a spigot, having an axis is provided for fitment to the engine mount. A bracket (11) is provided for fitment to the internal combustion engine. The bracket is arranged to receive the fitting in a direction parallel to its axis. The bracket includes an arrangement, such as a clamp, which is operable to cause the bracket to retain or release the fitting and the arrangement is accessible along a direction perpendicular to the direction in which the fitting is received into the bracket. This enables the engine mount to be released from the bracket by accessing the bracket from alongside rather than above.

14 Claims, 4 Drawing Sheets

(56) References Cited

U.S. PATENT DOCUMENTS

| | | | | |
|---|---|---|---|---|
| 4,625,939 A * | 12/1986 | Bergelt | ................. | F16F 1/3615 |
| | | | | 248/638 |
| 4,893,779 A * | 1/1990 | Bergelt | ............... | B60K 5/1283 |
| | | | | 180/292 |
| 5,129,479 A * | 7/1992 | Fujii | ................... | B60K 5/1216 |
| | | | | 180/297 |
| 6,270,051 B1 * | 8/2001 | Power | ..................... | B60K 5/12 |
| | | | | 248/634 |
| 6,386,309 B1 * | 5/2002 | Park | .................... | B60K 5/1216 |
| | | | | 180/291 |
| 6,988,579 B2 * | 1/2006 | Miyahara | ................. | F16F 1/38 |
| | | | | 180/299 |
| 7,025,344 B2 * | 4/2006 | Kammel | ................... | F16F 1/16 |
| | | | | 267/189 |
| 7,575,087 B2 * | 8/2009 | Kim | .................... | B60K 5/1216 |
| | | | | 180/291 |
| 7,871,108 B2 * | 1/2011 | Weibling | ............... | B62D 55/32 |
| | | | | 180/312 |
| 8,511,416 B2 * | 8/2013 | Hiruma | ................... | B60K 1/00 |
| | | | | 180/291 |
| 9,273,753 B2 * | 3/2016 | Yun | ...................... | F16F 1/3849 |
| 9,630,484 B1 * | 4/2017 | Valdez | ..................... | B60K 5/12 |
| 9,682,613 B2 * | 6/2017 | Miya | ..................... | B60K 5/1216 |
| 2003/0084865 A1 | 5/2003 | Yamagata | | |
| 2008/0073479 A1 | 3/2008 | Ohji | | |

FOREIGN PATENT DOCUMENTS

| | | | |
|---|---|---|---|
| JP | 2006281988 A | 10/2006 | |
| JP | 2007245864 A | 9/2007 | |
| JP | 2008202765 A | 9/2008 | |
| KR | 20000004632 A | 1/2000 | |

\* cited by examiner

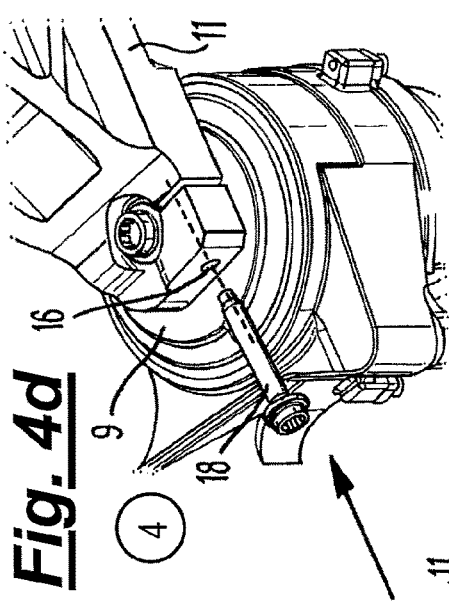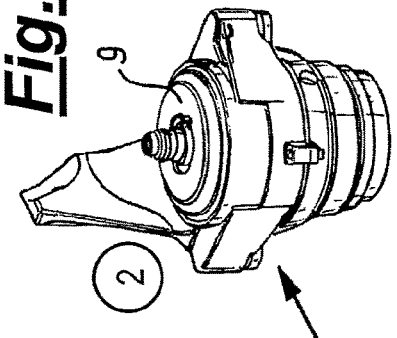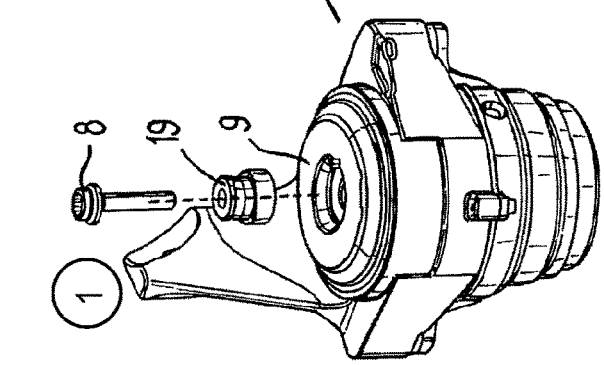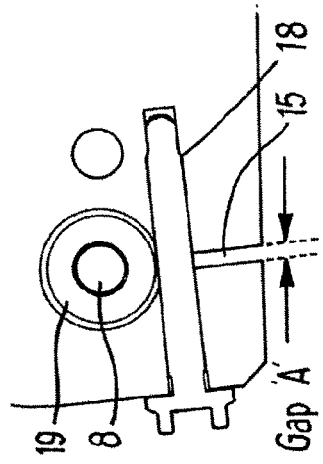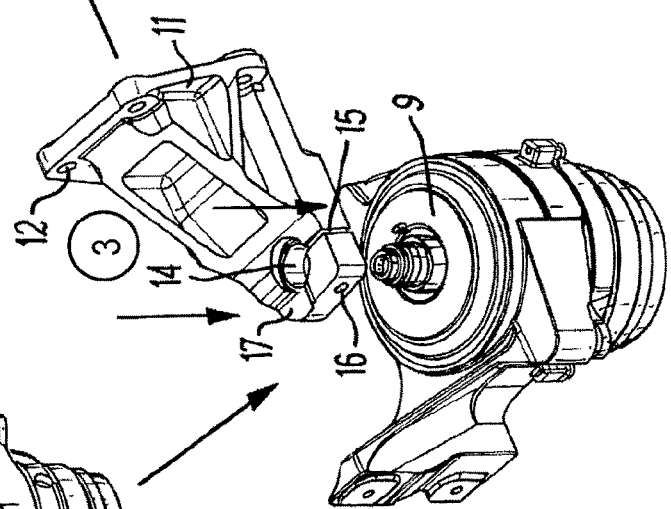

MOUNTING STRUCTURE FOR AN ENGINE MOUNT AND METHOD

CROSS REFERENCE TO RELATED APPLICATIONS

The present application is a national phase entry under 35 U.S.C. § 371 of International Application No. PCT/GB2015/050824, filed Mar. 20, 2015, entitled "MOUNTING STRUCTURE FOR AN ENGINE MOUNT AND METHOD," which designated, among the various States, the United States of America, and which claims priority to GB 1406336.6 filed Apr. 8, 2014, both of which are hereby incorporated by reference.

TECHNICAL FIELD OF THE INVENTION

The present invention relates to a mounting structure for an engine mount and to a method of removing the engine mount. The invention relates in particular to the mounting of internal combustion engines in automobiles.

BACKGROUND TO THE INVENTION

Market and regulatory driven need for increasing sophistication and performance of automobiles leads to the installation of more sophisticated, larger and more powerful internal combustion engines, and a greater amount of ancillary equipment in the automobile. The engine and ancillary equipment needs to be accommodated in a limited space, with the result that automobile engine compartments are increasingly crowded and present significant packaging problems.

Automobile internal combustion engines are mounted to the automobile via engine mounts which support the engine as well as limit the transmission of noise, vibration and harshness from the engine to the automobile structure. The characteristics of an engine mount may be adjustable in use, for example from a compliant setting suitable for isolating the engine from the automobile when the engine is idling to a stiffer setting which provides better control of the engine when the automobile is being driven.

As a consequence of their increasing sophistication engine mounts have become so called service items, which are intended to be replaced, or removed for adjustment or repair and replaced, during the life of the automobile. As a consequence it is desirable to be able to remove and replace the engine mounts easily.

In a conventional arrangement right angle brackets are fitted to the side of an automobile engine block, and secured by bolts which pass horizontally through the brackets an into bores in the block. Each bracket projects generally horizontally away from the engine block and is supported on a respective engine mount. A bolt extends downwardly through an aperture in each bracket and is received into a threaded aperture or fitting in the mount thereby to secure the bracket to the engine mount. Each engine mount is, in turn, supported by a bracket fitted to the automobile structure, typically to a structural part of the engine compartment or a sub-frame.

A problem with this arrangement is that to remove the engine mount it is necessary to access the bolt on top of the mount and unscrew it. Since the engine mount is generally located towards the bottom of the engine it is often difficult or impossible to reach the bolt when the engine is fitted in a crowded engine compartment in an automobile. This is a particular problem with wide V and W configuration engines and the result is that to remove an engine mount it is necessary to remove and/or partially disassemble the engine.

Embodiments of the present invention have been made in consideration of this problem.

SUMMARY OF THE INVENTION

According to the present invention there is provided a mounting structure for an engine mount for an internal combustion engine, the mounting structure comprising a fitting having an axis, for fitment to an engine mount, and a bracket for fitment to an internal combustion engine, the bracket being arranged to receive the fitting in a direction substantially parallel to its axis and comprising an arrangement which is operable to cause the bracket to retain or release the fitting, the arrangement being accessible along a direction which is substantially perpendicular to the direction in which the fitting is received into the bracket.

This enables an engine mount to be released from the bracket, by releasing the fitting from the bracket, by approaching the bracket in a direction which is generally at right angles to the direction in which it would be necessary to approach the fitting in order to release the engine mount from the bracket by removing the fitting (as is the case with conventional engine mount installations). This therefore enables the engine mount to be released from the bracket, and thus from an engine, in circumstances where it is not possible to access the fitting and remove it.

The fitting may have a substantially cylindrical portion which is accessible when the fitting is fitted to an engine mount. The axis of the fitting may be the axis of the cylindrical portion. The fitting may be elongate, and the axis of the fitting may be a long axis of the fitting. The fitting may be a spigot and may be a fastener, such as a bolt, and may extend through a collar.

The arrangement which is operable to cause the bracket to retain or release the fitting may be a clamp. The clamp may comprises an aperture formed through a portion of the bracket with a gap extending from the aperture to the edge of the bracket and a arrangement for urging the bracket either side of the gap together thereby to reduce the size of the aperture. The aperture may have a generally circular cross-section. The arrangement for urging the bracket either side of the aperture together may be a fastener, which may be a bolt. The fastener may be disposed in a bore in the bracket. The bore may extend substantially at right angles to the direction in which the fitting is received into the bracket.

The present invention also provides an installation comprising an internal combustion engine and a mounting structure as discussed above wherein the bracket is mounted to the internal combustion engine, the fitting is fitted to the engine mount and the fitting is received and retained by the bracket. The present invention also provides an automobile comprising such an installation wherein the engine mount is mounted to structure of the automobile and the engine may comprise structure which prevents the engine mount being accessed form above.

The present invention also provides a method of removing an engine mount from an automobile comprising the steps of:

accessing the arrangement of the bracket which is operable to release the fitting from the bracket, from one side;

releasing the engine mount from the automobile structure; and lowering the engine mount away from the engine, removing it from the bracket.

These steps may be performed without removing the fitting from the engine mount.

DETAILED DESCRIPTION OF THE INVENTION

In order that the invention may be more clearly understood an embodiment thereof will now be described, by way of example only, with reference to the accompanying drawings, of which:

Figure 6:
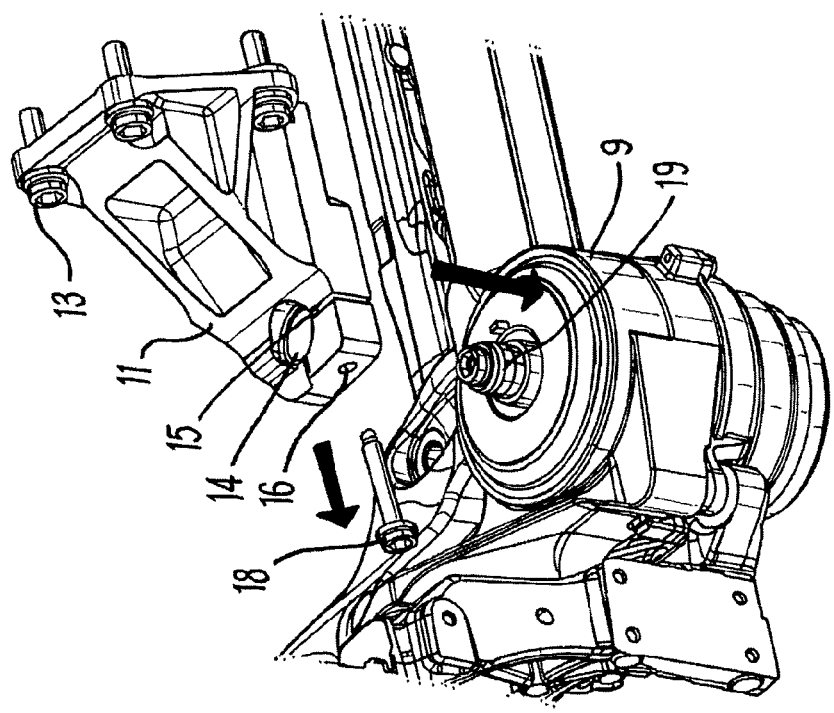
Figure 5:
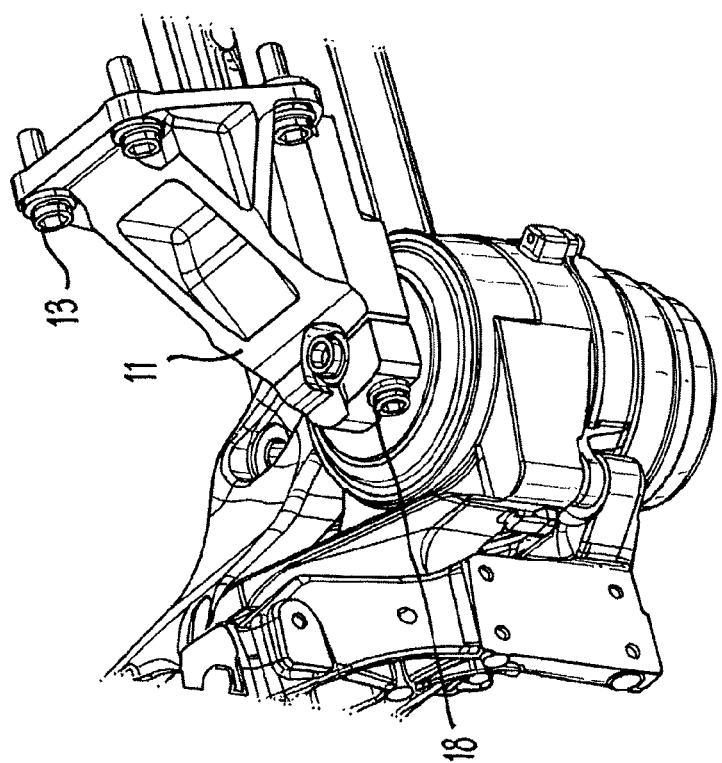

FIGS. 4a-d are perspective views of steps involved in fitting an engine mount to a bracket in an installation according to the invention;

FIG. 4e is a plan view of part of the bracket shown in FIGS. 4c and d;

FIG. 5 is a perspective view of an engine mount installation according to the invention; and FIG. 6 shows steps involved in removing the engine mount shown in FIG. 5.

In the following the terms top, bottom, side and like terms are used to refer to the apparatus in the orientation in which it is shown in the drawings, which is the orientation in which it is intended to be used, but should not be taken as otherwise limiting.

Figure 1:
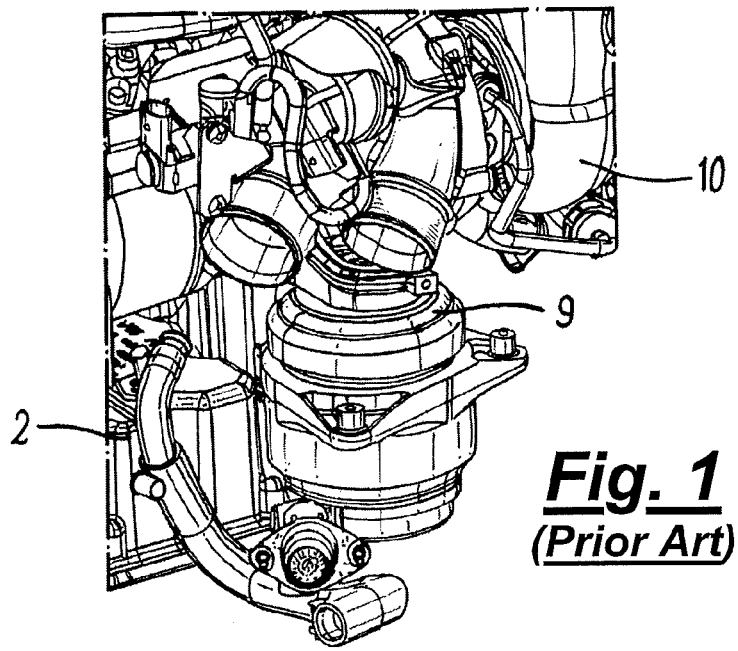
FIG. 1 is a partial, perspective view of a conventional engine mount installation in an automobile.
Figure 2:
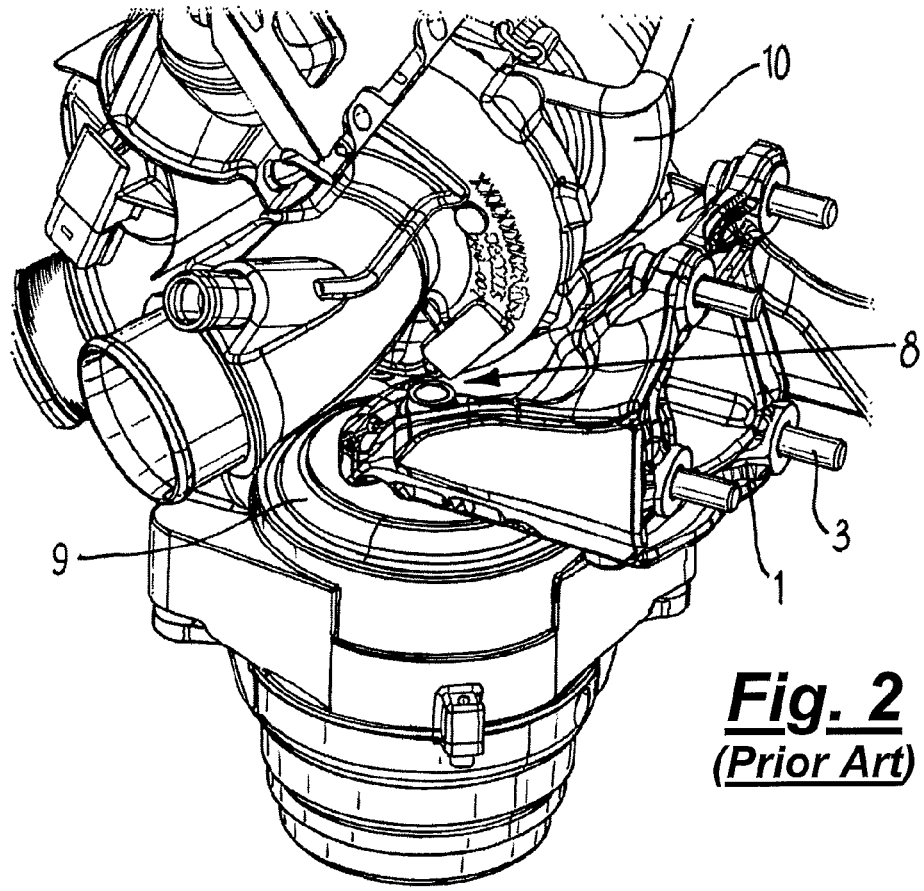
FIG. 2 is a partial perspective view of the installation of FIG. 1 from a different direction and not showing the engine block.
Figure 3:
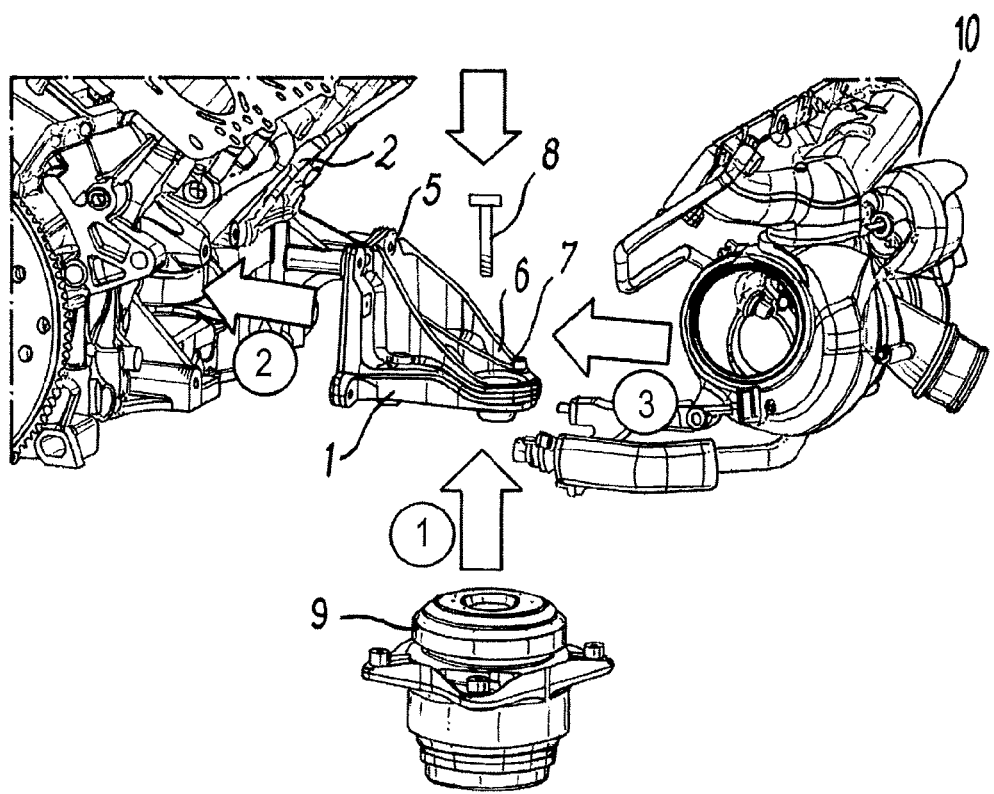
FIG. 3 shows steps required to install the engine mount of FIG. 1.

Referring to FIGS. 1 to 3, in a conventional arrangement an internal combustion engine is supported in the engine compartment of an automobile by a plurality of metal right angled brackets 1 (only one shown). Each bracket 1 is mounted to the block 2 of the engine by four bolts 3, or other suitable fasters, which pass through apertures 5 in the brackets and into bores in the block 2. The apertures 5 in the bracket all define short bores, and the axes of these bores are substantially parallel and will extend in a generally horizontal direction when the automobile is on a horizontal surface.

Each bracket 1 includes a projecting right angled portion 6 which, when the bracket is secured to the engine block 2, projects away from the engine block. The free end of this portion comprises a plate structure which defines an substantially circular aperture 7 defining a short bore with a generally upright axis (when the vehicle is on a horizontal surface). A bolt 8 extends downward through this aperture 7 and into an engine mount 9, which is in turn mounted to the automobile via a suitable bracket.

In the illustrated installation the engine mount 9 is located beneath an engine manifold and turbocharger installation 10 which inhibits access to the head of bolt 8 when fitted to the engine block 2.

Thus, as shown in FIG. 3, the fitting sequence involves first bolting the bracket 1 to the engine mount 9 with bolt 10. Then bolting the bracket 1 to the engine block with bolts 5 and then fitting the manifold and turbocharger assembly 10 to the engine block. The engine can then be installed into the engine compartment and the engine mounts 9 appropriately secured to the structure of the automobile via brackets.

So, to remove the engine mounts 9 for repair or replacement it is necessary to both remove the engine from the vehicle and partially dismantle it. This is inconvenient and time consuming.

Referring now to FIGS. 4 to 6, the invention provides an alternative bracket 11. This comprises similar apertures 12 to those apertures 5 of the conventional bracket 1, to enable the bracket 11 to be mounted to an engine block with bolts 13. And it also comprises a plate structure 17 which defines a substantially circular aperture 14 defining a short bore with an axis generally at right angles to the bores defined by apertures 12 so that the axis of the aperture 14 is generally upright in use. It differs from the conventional bracket 1 however in that a strip of material is cut out of the plate structure to create a generally parallel sided gap 15 which extends from the aperture 14 to the an edge of the plate structure. A bore 16 is formed from another outside edge of the plate structure, the edge extending approximately at right angles to the edge in which the gap 15 is formed, into the gap 15 and continues into an internally threaded bore on the opposite side of the gap 15.

A bolt 18 can be introduced into the bore 16 and tightened in order to draw the parts of the plate structure either side of the gap 15 together to slightly reduce the size of the aperture 14.

For use with this modified bracket a bolt 8 is passed through a cylindrical collar 19 and into the top of the engine mount 9. The bolt secures the collar 19 to the engine mount 9, and the collar 19 has a substantially cylindrical external surface which forms a spigot on the engine mount 9. The collar 19 is sized so that it fits snugly into the aperture 14 of the bracket 11, whereupon the bolt 18 can be inserted and tightened to clamp the collar 19, and thus the engine mount 9, to the bracket 11.

This enables the engine mount 9 to be fitted and removed from the bracket 11 without having to remove the bolt 8. In the intended installation bolt 18 can be accessed from alongside the engine mount 9 whereas, as shown in FIGS. 1 and 2, bolt 8 cannot.

Thus, in contrast to the existing arrangement, the engine mount can be removed without having to remove or dismantle the engine. As shown in FIG. 6, it is only necessary to slacken or remove the bolt 18 to allow the collar 19 to be removed from the bracket 11. Then, when the engine mount 9 has been disconnected from the automobile structure it can be removed. A reverse procedure may be employed for refitting the engine mount or for fitting a replacement engine mount. No alteration has been made to the engine mount 9.

The above embodiment is described by way of example only. Many variations are possible without departing from the scope of the invention as defined in the appended claims.

The invention claimed is:

1. A mounting structure for an engine mount for an internal combustion engine, the mounting structure comprising a fitting having an axis, for fitment to an engine mount, and a bracket for fitment to an internal combustion engine, the bracket being arranged to receive the fitting in an aperture formed in the bracket in a direction substantially parallel to its axis, the bracket comprising a clamp which is operable to cause the bracket to retain or release the fitting, the clamp being operably accessible along a direction which is substantially perpendicular to the direction in which the fitting is received into the bracket.

2. A mounting structure as claimed in claim 1 wherein the fitting has a substantially cylindrical portion which is accessible when the fitting is fitted to an engine mount, and the axis of the fitting is the axis of the cylindrical portion.

3. A mounting structure as claimed in claim 1 wherein the fitting is a spigot.

4. A mounting structure as claimed claim 1 wherein the fitting comprises a fastener extending through a collar.

5. A mounting structure as claimed in claim 1 wherein the clamp comprises the aperture formed through a portion of the bracket with a gap extending from the aperture to the edge of the bracket and an arrangement for urging the bracket on either side of the gap together to reduce the size of the aperture.

6. A mounting structure as claimed in claim 1 wherein the aperture has a generally circular cross-section.

7. A mounting structure as claimed in claim 5 wherein the arrangement for urging the bracket on either side of the aperture together is a fastener.

8. A mounting structure as claimed in claim 7 wherein the fastener is a bolt.

9. A mounting structure as claimed in claim 7 wherein the fastener is disposed in a bore in the bracket.

10. A mounting structure as claimed in claim 9 wherein the bore extends substantially at a right angle to the direction in which the fitting is received into the bracket.

11. An installation comprising an internal combustion engine and a mounting structure as claimed in claim 1 wherein the bracket is mounted to the internal combustion engine, the fitting is fitted to the engine mount and the fitting is received and retained by the bracket.

12. An automobile comprising an installation as claimed in claim 11 wherein the engine mount is mounted to structure of the automobile.

13. An automobile as claimed in claim 12 wherein the engine prevents the engine mount being accessed from above.

14. A method of removing an engine mount from the automobile claimed in claim 13 comprising:
   a. accessing the clamp of the bracket which is operable to release the fitting from the bracket, from one side;
   b. releasing the engine mount from the automobile structure; and
   c. lowering the engine mount away from the engine, removing it from the bracket.

* * * * *